United States Patent
Chaudry et al.

(10) Patent No.: US 7,409,204 B2
(45) Date of Patent: Aug. 5, 2008

(54) METHOD FOR ELIMINATING MULTIPLE NOTIFICATIONS FOR THE SAME VOICEMAIL MESSAGE

(75) Inventors: Shahid R. Chaudry, Ottawa (CA); M. Khaledul Islam, Kanata (CA)

(73) Assignee: Research In Motion Limited, Waterloo (CA)

(*) Notice: Subject to any disclaimer, the term of this patent is extended or adjusted under 35 U.S.C. 154(b) by 793 days.

(21) Appl. No.: 10/727,847

(22) Filed: Dec. 4, 2003

(65) Prior Publication Data
US 2005/0124325 A1 Jun. 9, 2005

(51) Int. Cl.
*H04M 11/10* (2006.01)
(52) U.S. Cl. .................. 455/413; 455/412.1; 455/412.2
(58) Field of Classification Search ... 455/412.1–412.2, 455/413
See application file for complete search history.

(56) References Cited

U.S. PATENT DOCUMENTS

| 5,347,269 | A | 9/1994 | Vanden Heuvel | |
| 5,384,565 | A | 1/1995 | Cannon | |
| 6,032,039 | A | 2/2000 | Kaplan | |
| 6,317,485 | B1* | 11/2001 | Homan et al. | 379/88.12 |
| 6,405,035 | B1 | 6/2002 | Singh | |
| 2002/0006782 | A1 | 1/2002 | Kim | |
| 2002/0006783 | A1 | 1/2002 | Yamaoka | |
| 2002/0136173 | A1 | 9/2002 | Monroe et al. | |
| 2004/0266403 | A1* | 12/2004 | Boland et al. | 455/412.2 |

FOREIGN PATENT DOCUMENTS

EP 0 481 683 A 4/1992

OTHER PUBLICATIONS

EP 05009011 European Search Report completed Nov. 24, 2005 contained in EPO Communication dated Dec. 9, 2005.

* cited by examiner

*Primary Examiner*—Duc Nguyen
*Assistant Examiner*—Eric Elcenko
(74) *Attorney, Agent, or Firm*—Moffat & Co.

(57) ABSTRACT

A method for eliminating voicemail notifications on a wireless device for a voicemail message that a user has previously been notified of, comprising the steps of: storing information on the wireless device about the voicemail message; comparing incoming information of a new voicemail notification received by the wireless device against the information stored in the storing step; and notifying the user of the voicemail message only if the incoming information differs from the information stored in the storing step.

16 Claims, 2 Drawing Sheets

METHOD FOR ELIMINATING MULTIPLE NOTIFICATIONS FOR THE SAME VOICEMAIL MESSAGE

FIELD OF THE INVENTION

The present invention relates to voicemail notifications for wireless devices and, in particular, to the elimination of multiple network-initiated notifications for the same voicemail message.

BACKGROUND TO THE INVENTION

In a wireless network, a user is notified that a voicemail message is waiting when the user receives a voicemail. This notification involves the current mobile switch that the wireless device is connected to sending a message to the wireless device indicating how many voicemail messages are waiting to be checked.

Currently, when a wireless device receives a Message Waiting or Voice Mail Notification message, it immediately sends an acknowledgement message to the network as an indication that the message was received by the wireless device and then notifies the user of the receipt of a voice mail message. It is up to the user to make a call to the Voice Mail System and listen to the pending voice mail.

In addition, it is the responsibility of the network to send a message to explicitly indicate the number of remaining pending messages, if any, if the user has listened to some or all the pending voice mails.

A problem frequently occurs with current voicemail notification when a mobile user moves from one network boundary to another (e.g. one mobile switch, system, network or registration zone to a second mobile switch system, network or registration zone). In such boundary crossings, the wireless device is usually required by the network to register with it and a notification message is sent that a voicemail message is waiting. In such instances of mobility where the wireless device is required to register with different networks, the wireless device can receive the same voicemail message notification repeatedly. In a data device, the same notification message appears multiple times in its incoming message folder. The problem gets worse at network boundaries where the user may go back and forth between two networks and each transition is accompanied by the same voicemail notification message.

Voicemail notifications can be either sent as a signaling message or as a short message service over the common paging channel or dedicated traffic channel, but regardless of the method used to convey the voicemail notification to the wireless device, repeated notifications of the same voicemail message are annoying to the user and can lead to a negative impression by the user of the wireless service.

SUMMARY OF THE INVENTION

The present invention seeks to overcome the deficiencies in the prior art by providing a method to eliminate multiple notifications for the same voicemail message. A voicemail notification from a mobile switch to a wireless device includes information about the number of voicemail messages that are waiting to be heard by the user. In one embodiment of the present invention, the wireless device stores the number of pending voicemail messages as directed by the most recently received message from the network. Whenever it receives a new voicemail notification message, it immediately sends an acknowledgement back to the network, which simply indicates that the notification message was successfully received by the device. The device then compares the number of voicemail messages waiting as received in the notification message to that stored on the wireless device. If the device detects the same number of voicemail messages as identified by the current notification message, the device will realize that this voicemail has previously been brought to the user's attention and will therefore avoid notifying the user a second time.

In an alternative embodiment of the present invention, the network itself registers that the wireless device has acknowledged the receipt of voicemail notification message corresponding to particular unheard voicemail messages and will thus refrain from sending further voicemail notification messages for same unheard voicemail messages. Voicemail notifications are stored at a voice mail system, which communicates with the mobile switch the wireless device is currently connected to. When a wireless device moves into a network, the mobile switch receives a notification message from voice mail system that a voicemail message is waiting and sends this to the wireless device. In this embodiment, when the wireless device acknowledges the voicemail message notification, the mobile switch sends this acknowledgement to the voice mail system. The voice mail system then registers that the present voicemail message notification has been acknowledged and will not require any mobile switch subsequently connected to by the wireless device to notify the user of this voicemail message. In this way, a single acknowledgement prevents further voicemail notifications for the same message. New notification messages will however still be forwarded to wireless device and the user notified of the new message.

The present invention therefore provides a method for eliminating voicemail notifications on a wireless device for a voicemail message that a user has previously been notified of, comprising the steps of: storing information on said wireless device about said voicemail message; comparing incoming information of a new voicemail notification received by said wireless device against said information stored in said storing step; and notifying the user of said voicemail message only if said incoming information differs from said information stored in said storing step.

The present invention further provides a method for eliminating repeat voicemail notifications on a wireless device for a voicemail message that said wireless device has previously acknowledged, comprising the steps of: adding a flag on said voicemail message at a voicemail system once said wireless device has acknowledged said voicemail message; and notifying the wireless device of said voicemail message only if said voicemail message does not have said flag.

BRIEF DESCRIPTION OF THE DRAWINGS

The present invention is best understood with reference to the drawings, in which.

DETAILED DESCRIPTION OF THE DRAWINGS

Figure 1:
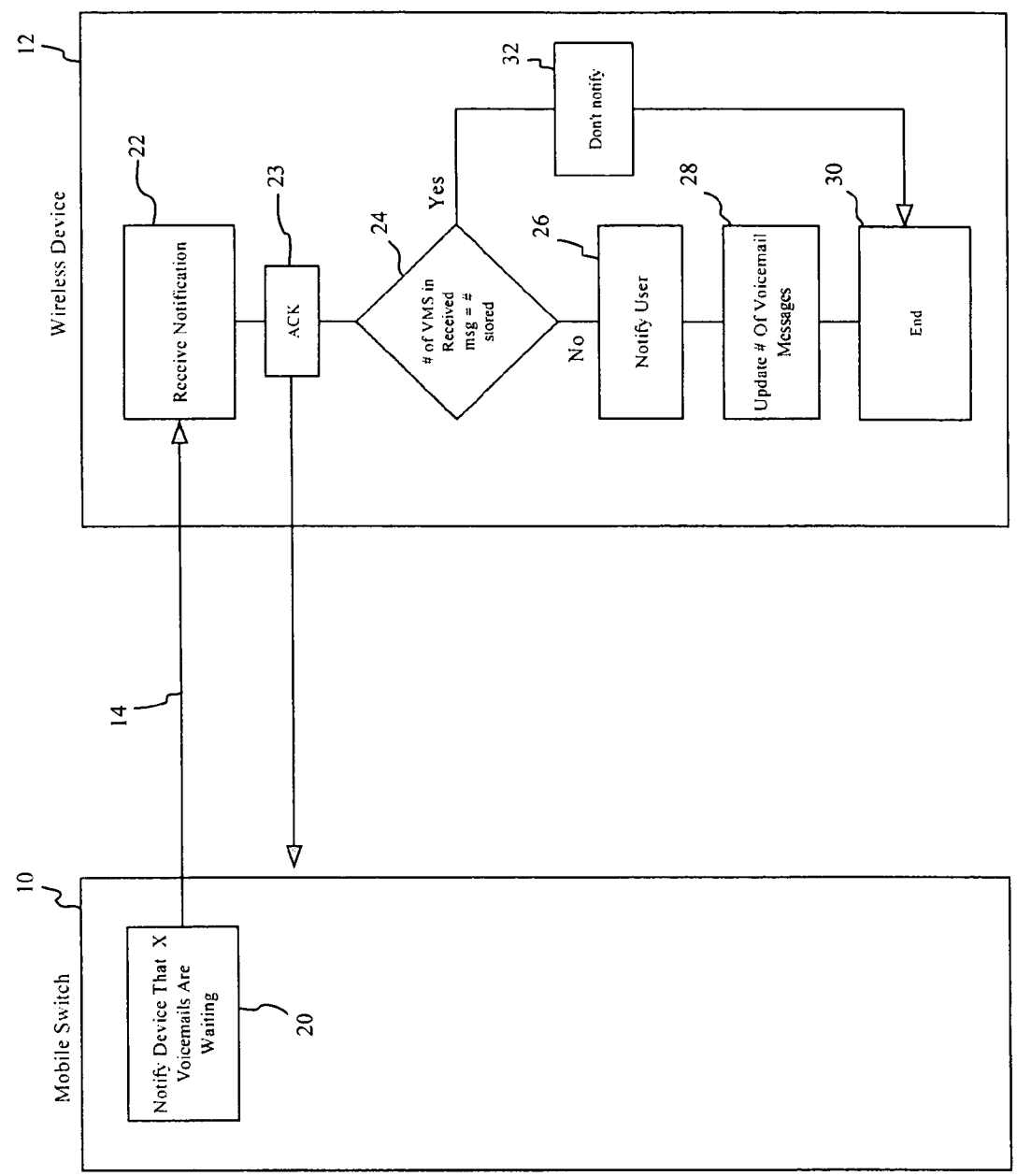
FIG. 1 is a process diagram of the method of one embodiment of the present invention.

Reference is now made to FIG. 1. A mobile switch 10 is connected to a wireless device 12 through a radio link. Wireless device 12 registers with mobile switch 10 and mobile switch 10 knows that it is servicing wireless device 12.

Mobile switch 10 receives a message 20 that it should notify the wireless device 12 that the wireless device has a specific number of voicemail messages waiting. The notification message 20 includes the number of voicemail messages that are waiting. Mobile switch 10, through the wireless link 14, sends the notification message to wireless device 12 and in step 22 wireless device 12 receives the notification message.

In step 23, wireless device 12 automatically acknowledges that it has received the notification in step 22. This is to ensure that mobile switch 10 does not repeatedly send notification message 20, which will occur if mobile switch 10 does not receive an acknowledgement.

After sending the acknowledgement, wireless device 12 checks the received voicemail notification for the number of voicemail messages that are waiting. In step 24, the wireless device compares the number of voicemail messages waiting as indicated in the voicemail notification with the number of voicemail messages that the wireless device knows about. If the number of voicemail messages indicated in the voicemail notification is different from the number of voicemail messages the wireless device knows about, the wireless device moves to step 26 in which the user is notified that he or she has a voicemail message waiting.

A notification can be in the form of an audio signal, such as a tone being played, or a visual signal such as a pop-up window opening or a message indicator icon being displayed. Depending on the device, the message indicator icon could include a display with the number of messages waiting. Further, in some devices with message centres on the device, a visual notification can be a message in the message centre indicating the type of message and the time when the notification was sent. It is also possible to use both audio and visual notifications at the same time, and one skilled in the art will appreciate that other audio and visual notifications are possible.

The wireless device further, in step 28, updates the number of voicemail messages that it knows about and in step 30 the process ends.

If, in step 24, the number of messages indicated in the notification message is the same as the number of voicemail messages known to the wireless device, the wireless device skips steps 26 and 28 by going through step 32. In step 32 the wireless device 12 knows that it has previously notified a user of the voicemail message and thus does not notify the user again.

The process moves from step 32 to step 30 and ends.

In operation, when a new voicemail message is received, mobile switch 10 is told to notify the device of the new voicemail. A voicemail notification is received at step 22 and the device compares the incoming information in the voicemail notification, which includes the total number of voicemail messages waiting, with the number of voicemail messages the device knows about. The result of this comparison is that the number of voicemail messages waiting in the voicemail notification is different than the number of voicemail messages the device knows about. The device thus notifies the user and updates the number of voicemail messages it knows about.

Conversely, if the device moves from one network to another and a new mobile switch 10 is told to notify the device that there are voicemail messages waiting, where these voicemail messages have previously been acknowledged with the old mobile switch, the wireless device 12 will receive the voicemail notification in step 22 and will realize in step 24 that the voicemail notification has the same number of voicemail messages waiting as the wireless device currently knows about. In this case, the wireless device will realize that it has previously notified the user of these voicemail messages and will not notify the user again.

As is known to those skilled in the art, when a user eventually listens to and/or deletes a voicemail message, the network will reduce the number of pending voicemail messages and notify the device of the reduced number of pending voicemail messages via voicemail notification message.

The above examples illustrate one embodiment of the invention. One skilled in the art will realize that the wireless device may have other means of identifying whether it has previously notified the user of the voicemail message.

Figure 2:
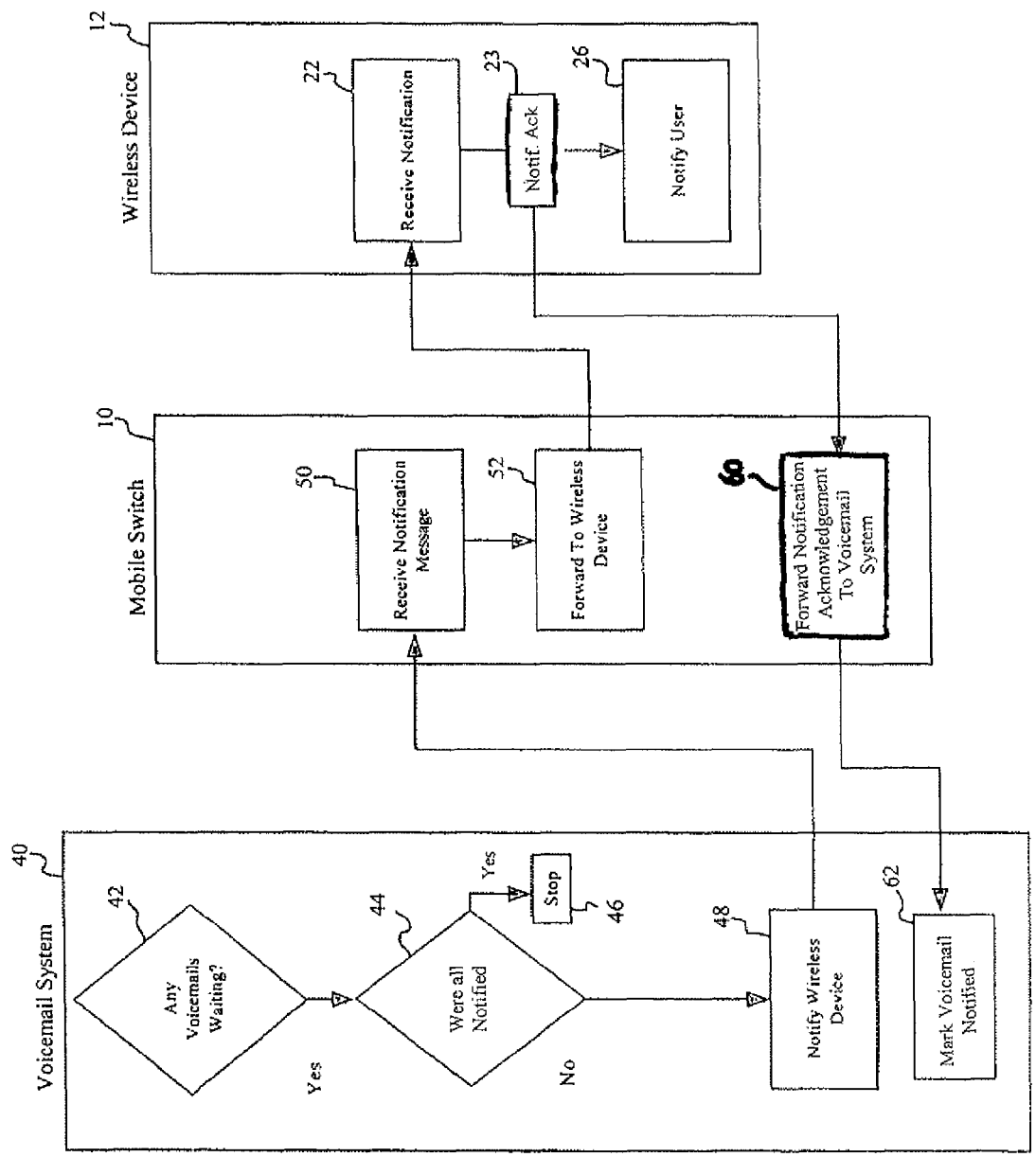
FIG. 2 is a process diagram of the method of an alternative embodiment of the present invention.

Reference is now made to FIG. 2. A voicemail system 40 stores information about voicemail messages waiting for various wireless devices. As one skilled in the art will realize, voicemail system 40 is located within the wireless network but generally remotely from a mobile switch 10.

In step 42 voicemail system 40 checks whether any voicemail messages are waiting for a particular wireless device 12. Step 42 may be initiated based on notification that the wireless device 12 has entered a new mobile switch 10 (serving area) or based on other factors that are known to those skilled in the art. If no voicemail message is waiting in Step 42 the process ends. Conversely, if any voicemail messages are waiting, the method next moves to step 44. In step 44 the voicemail system 40 checks whether all the voicemail message notifications have previously been delivered. Delivery as used herein indicates that a voicemail message notification was sent to wireless device 12 and was acknowledged by the wireless device.

Preferably a flag exists for voicemail messages that have been previously delivered (notified) and step 44 knows of said previous deliveries based on said flag. If a previous delivery has been sent voicemail system 40 next moves to step 46, which stops the process.

Conversely, if any voicemail messages for wireless device 12 have not been previously delivered (notified), voicemail system 40 moves to step 48 in which a voicemail notification is sent to mobile switch 10.

Mobile switch 10 receives the voicemail notification in step 50 and forwards it to the wireless device in step 52. As in the method of the present invention described above, wireless device 12 receives the voicemail notification in step 22, acknowledges it in step 23, and moves to step 26 to notify the user.

As one skilled in the art will appreciate steps 24 and 28 are no longer required in this alternative method since the voicemail system controls the notifications being sent.

Voicemail system 40 received the acknowledgement from mobile switch 10 and in step 62 marks the voicemail message or messages as being delivered (notified). Voicemail system 40 will thereafter not send voicemail notifications to wireless device 12 unless a new voicemail message is received.

In operation, the alternative method of FIG. 2 will therefore only send a voicemail notification that the voicemail message is waiting a single time. After this first notification has been sent and an acknowledgment received, the voicemail message is marked to indicate that it has been delivered (notified) and thereafter its notification will not be re-sent.

The present invention therefore overcomes the disadvantages of the prior art by providing a method on a wireless device to check whether a voicemail message has previously been received. Alternatively, a voicemail system 40 stores information whether the voicemail message has previously been delivered (notified). In both cases the user is not notified repeatedly of the same message, thereby solving a problem with current wireless devices.

The present invention therefore overcomes the disadvantages of the prior art by providing a method on a wireless device to check whether a voicemail message has previously been received. Alternatively, a voicemail system 40 stores information whether the voicemail message has previously been delivered. In both cases the user is not notified repeatedly of the same message, thereby solving a problem with current wireless devices.

Although the present invention has been described with regard to the preferred embodiments thereof, one skilled in the art will easily realize that other variations are possible, and that the invention is only intended to be limited in scope by the following claims.

We claim:

1. A method for reducing repeat voicemail notifications generated by a wireless device for an unheard voicemail message that a user of the wireless device has previously been notified of, comprising wireless device steps of:
   storing notification information about said voicemail message at said wireless device;
   receiving at said wireless device subsequent voicemail message notification of at least one unheard voicemail message following registration of the wireless device with wireless network infrastructure;
   comparing said subsequently received notification information against stored notification information;
   notifying the user via a voicemail notification of at least one new unheard voicemail message only if said subsequent notification information differs from said stored notification information; and
   updating said notification information stored at said wireless device if said subsequent notification information differs from said stored notification information.

2. The method of claim 1, wherein said stored notification information includes a value representing a number of unheard voicemail messages said wireless device has notified the user of that the user has not deleted.

3. The method of claim 2, wherein said subsequent notification information includes a value representing a total number of unheard voicemail messages waiting for the user.

4. The method of claim 3, wherein said comparing step compares said number representing unheard voicemail messages said wireless device has notified the user of and said total number of unheard voicemail messages waiting for the user.

5. The method of claim 1, wherein said information stored in said storing step includes a voicemail identification number for said voicemail message.

6. The method of claim 1, wherein said information stored in said storing step includes a timestamp for said voicemail message.

7. The method of claim 1, wherein said voicemail notifications are audio notifications.

8. The method of claim 7, wherein said audio notifications include a tone being played.

9. The method of claim 1, wherein said voicemail notifications are visual notifications.

10. The method of claim 9, wherein said visual notifications are pop-up windows.

11. The method of claim 9, wherein said visual notifications are a message indicator icon.

12. The method of claim 11, wherein said message indicator icon includes a display with the number of unheard voicemail messages waiting.

13. The method of claim 9, wherein said visual notifications includes a message in a message centre indicating a type of message and a notification time.

14. The method of claim 1, wherein said voicemail notifications include both audio and visual notifications.

15. The method of claim 1, wherein registering the wireless device includes one of initially registering the wireless device with a first wireless network and re-registering the wireless device with said first wireless network.

16. The method of claim 1, wherein registering the wireless device includes registering the wireless device with a second wireless network due to a switch to the second wireless network from a first wireless network.

\* \* \* \* \*